United States Patent
Takhirov et al.

(10) Patent No.: US 11,866,056 B2
(45) Date of Patent: *Jan. 9, 2024

(54) BALLISTIC ESTIMATION OF VEHICLE DATA

(71) Applicant: BEIJING VOYAGER TECHNOLOGY CO., LTD., Beijing (CN)

(72) Inventors: Zafar Takhirov, Santa Clara, CA (US); Qi Chen, Burlingame, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 424 days.

This patent is subject to a terminal disclaimer.

(21) Appl. No.: 16/953,296

(22) Filed: Nov. 19, 2020

(65) Prior Publication Data

US 2021/0078587 A1    Mar. 18, 2021

Related U.S. Application Data

(63) Continuation of application No. 16/039,329, filed on Jul. 19, 2018, now Pat. No. 10,875,540.

(51) Int. Cl.
| | |
|---|---|
| *B60W 50/00* | (2006.01) |
| *G07C 5/00* | (2006.01) |
| *G07C 5/08* | (2006.01) |
| *B60W 40/105* | (2012.01) |
| *B60W 40/107* | (2012.01) |
| *G06N 20/00* | (2019.01) |

(52) U.S. Cl.
CPC ...... *B60W 50/0097* (2013.01); *B60W 40/105* (2013.01); *B60W 40/107* (2013.01);
(Continued)

(58) Field of Classification Search
CPC .......... B60W 50/0097; B60W 40/105; B60W 40/107; B60W 2050/0031;
(Continued)

(56) References Cited

U.S. PATENT DOCUMENTS

| | | | |
|---|---|---|---|
| 2017/0225688 A1* | 8/2017 | Milanese | B60W 30/02 |
| 2018/0150081 A1 | 5/2018 | Gross et al. | |

(Continued)

FOREIGN PATENT DOCUMENTS

| | | |
|---|---|---|
| CN | 106608259 A | 5/2017 |
| CN | 108137083 A | 6/2018 |
| WO | 2017/165627 A1 | 9/2017 |

OTHER PUBLICATIONS

International Preliminary Report on Patentability issued in corresponding International Application No. PCT/US2018/067563, dated Jan. 28, 2021, 8 pages.

(Continued)

*Primary Examiner* — Thomas Ingram
(74) *Attorney, Agent, or Firm* — BAYES PLLC

(57) ABSTRACT

Embodiments of the disclosure provide systems and methods for ballistically estimating vehicle data. The system may include a communication interface configured to receive a first vehicle measurement taken at a first time point and a second vehicle measurement taken at a second time point. The system may further include at least one processor. The at least one processor may be configured to estimate a first version of vehicle data at a first speed for each of the second time point and a plurality of intermediate time points between the first time point and the second time point based on the first vehicle measurement using a prediction model. The at least one processor may be further configured to compute a second version of vehicle data at a second speed for the second time point based on the second vehicle measurement. The first speed is faster than the second speed. The at least one processor may also be configured to determine whether to update the prediction model based on a comparison between the first version of vehicle data and the second version of vehicle data for the second time point.

20 Claims, 5 Drawing Sheets

(52) U.S. Cl.
CPC ............. *G06N 20/00* (2019.01); *G07C 5/008* (2013.01); *G07C 5/085* (2013.01); *B60W 2050/0031* (2013.01); *B60W 2420/42* (2013.01); *B60W 2420/52* (2013.01)

(58) Field of Classification Search
CPC .......... B60W 2420/42; B60W 2420/52; G06N 20/00; G06N 3/08; G07C 5/008; G07C 5/085; G07C 5/0808; G07C 5/0866
See application file for complete search history.

(56) References Cited

U.S. PATENT DOCUMENTS

2018/0157918 A1* 6/2018 Levkova ................ G06V 20/56
2018/0222475 A1 8/2018 Andersson et al.
2019/0025853 A1* 1/2019 Julian .................... G06V 10/82

OTHER PUBLICATIONS

Eraqi H. M. et al., "End-to-End Deep Learning for Steering Autonomous Vehicles Considering Temporal Dependencies", arXiv preprint arXiv:1710.03804, Nov. 22, 2017, 8 pages.

Yang Z. et al., "End-to-end Multi-Modal Multi-Task Vehicle Control for Self-Driving Cars with Visual Perceptions", arXiv preprint arXiv:1801.06734, Feb. 2, 2018, 6 pages.

Notice of First Examination Opinion issued in corresponding Chinese Application No. 2018800947065, dated Oct. 28, 2023, 11 pages.

* cited by examiner

BALLISTIC ESTIMATION OF VEHICLE DATA

CROSS-REFERENCE TO RELATED APPLICATIONS

The present application is a continuation of U.S. patent application Ser. No. 16/039,329, filed Jul. 19, 2018, the entire content of which is incorporated herein by references.

TECHNICAL FIELD

The present disclosure relates to systems and methods for estimating vehicle data, and more particularly to, systems and methods for ballistically estimating vehicle data using a model that is adaptively updated using a difference between the calculated data and the estimated data.

BACKGROUND

Autonomous driving technology relies on large scale computation of vehicle data. For example, autonomous driving vehicles need to capture and process various vehicle data to obtain the vehicle data necessary to perform functions such as positioning, ambience recognition, decision making and control. For example, a vehicle may be equipped with multiple integrated sensors such as a Light Detection And Ranging (LiDAR) LiDAR, a Global Positioning System (GPS) receiver, one or more Inertial Measurement Unit (IMU) sensors, RADAR sensors, Sonic and Ultra Sonic sensors, and one or more cameras, to capture data such as images/videos, point clouds, vehicle pose information, etc.

Because autonomous driving vehicles often have to make decisions in real-time. Therefore, it is often critical to have a result of computation ready as soon as possible. However, this is difficult due to computational limitations. For example, processing a video feed from vehicle cameras could take a relatively long time (e.g., 200-300 ms), but the decision has to be made in less than 100 ms. To improve the data processing speed, one approach is to use a powerful computing unit. However, this approach is usually very costly solution, and also has limited scalability. Another approach is to use a less accurate, but faster processing algorithm to identify the next state of the environment. For example, one may use Kalman filter or recurrent neural networks to predict the behavior of the system before the computation is complete. However, this approach is usually computationally expensive and requires a lot of prior knowledge to behave properly. If the prior knowledge is imprecise, all future predictions become erroneous, which leads to unexpected behavior. The approach may also suffer from limited statistical performance (e.g., higher error rate, lower precision, etc.), which might be problematic under certain circumstances. Therefore, an improved system and method for estimating vehicle data fast and accurately is needed.

Embodiments of the disclosure address the above problems by systems and methods for ballistically estimating vehicle data using a model that is adaptively updated using a difference between the calculated data and the estimated data.

SUMMARY

Embodiments of the disclosure provide a system for ballistically estimating vehicle data. The system may include a communication interface configured to receive a first vehicle measurement taken at a first time point and a second vehicle measurement taken at a second time point. The system may further include at least one processor. The at least one processor may be configured to estimate a first version of vehicle data at a first speed for each of the second time point and a plurality of intermediate time points between the first time point and the second time point based on the first vehicle measurement using a prediction model. The at least one processor may be further configured to compute a second version of vehicle data at a second speed for the second time point based on the second vehicle measurement. The first speed is faster than the second speed. The at least one processor may also be configured to determine whether to update the prediction model based on a comparison between the first version of vehicle data and the second version of vehicle data for the second time point.

Embodiments of the disclosure also provide a method for ballistically estimating vehicle data. The method may include receiving, via a communication interface, a first vehicle measurement taken at a first time point and a second vehicle measurement taken at a second time point. The method may further include estimating, by at least one processor, a first version of vehicle data at a first speed for each of the second time point and a plurality of intermediate time points between the first time point and the second time point based on the first vehicle measurement using a prediction model. The method may yet further include computing, by the at least one processor, a second version of vehicle data at a second speed for the second time point based on the second vehicle measurement. The first speed is faster than the second speed. The method may then include determining, by the at least one processor, whether to update the prediction model based on a comparison between the first version of vehicle data and the second version of vehicle data for the second time point.

Embodiments of the disclosure further provide a non-transitory computer-readable medium having instructions stored thereon that, when executed by one or more processors, causes the one or more processors to perform a method for ballistically estimating vehicle data. The method may include receiving a first vehicle measurement taken at a first time point and a second vehicle measurement taken at a second time point. The method may further include estimating a first version of vehicle data at a first speed for each of the second time point and a plurality of intermediate time points between the first time point and the second time point based on the first vehicle measurement using a prediction model. The method may yet further include computing a second version of vehicle data at a second speed for the second time point based on the second vehicle measurement. The first speed is faster than the second speed. The method may then include determining whether to update the prediction model based on a comparison between the first version of vehicle data and the second version of vehicle data for the second time point.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
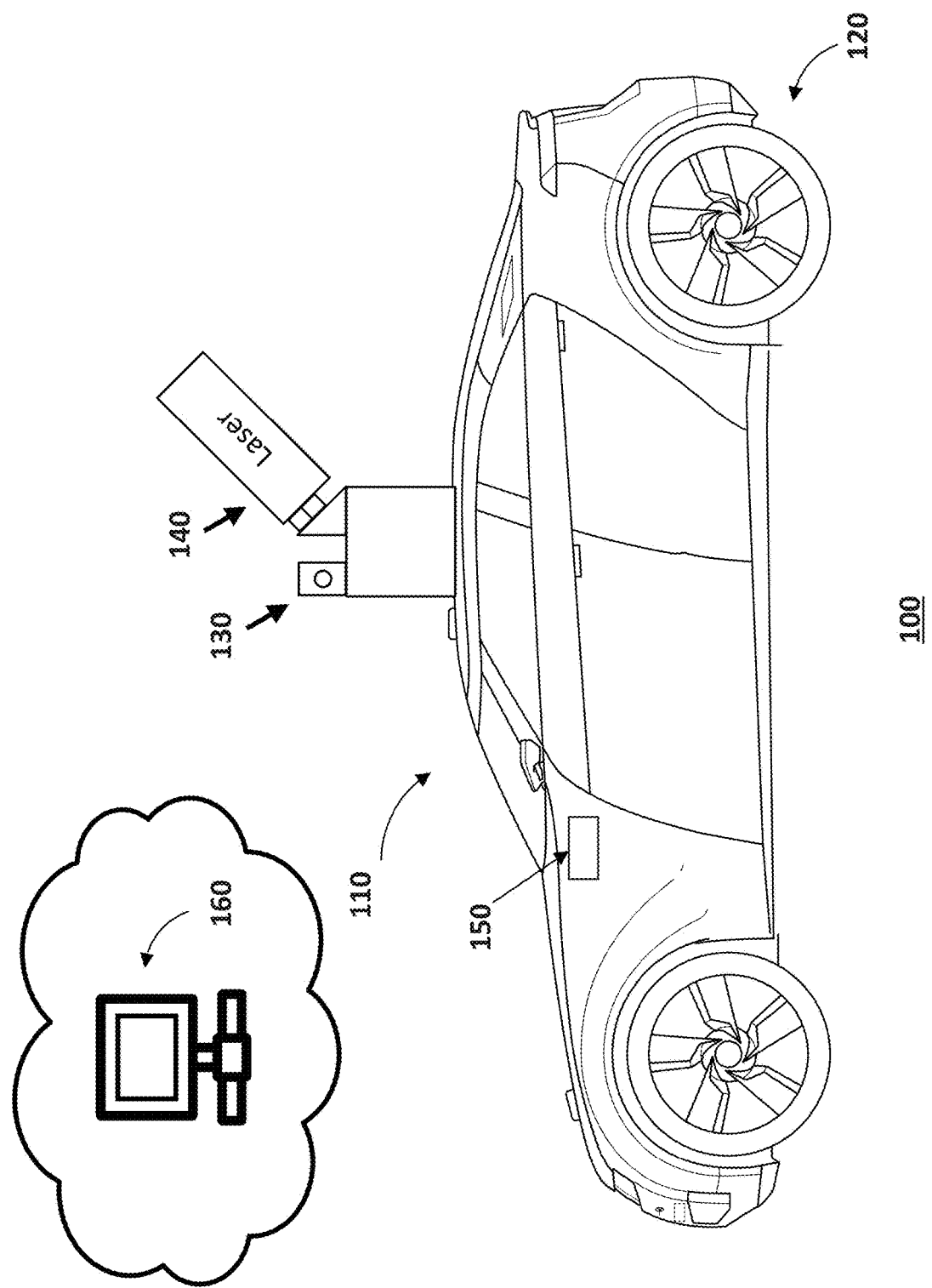
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be configured to be operated by an operator occupying the vehicle, remotely controlled, and/or autonomous. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWR), or rear wheel drive (RWD).

As illustrated in FIG. 1, vehicle 100 may be equipped with sensor 140 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which sensor 140 or 150 can be equipped on vehicle 100 are not limited by the example shown in FIG. 1, and may be modified depending on the types of sensors of 140/150 and/or vehicle 100 to achieve desirable sensing performance.

In some embodiments, sensors 140 and 150 may be configured to capture data as vehicle 100 travels along a trajectory. Consistent with the present disclosure, sensor 140 may be a camera configured to take pictures or videos of the surrounding. For example, the camera may be a monocular or binocular camera. In some embodiments, sensor 140 may also be a LiDAR configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. In some embodiments, a LiDAR may capture a point cloud. Point cloud data may contain a set of data points on the external surfaces of objects around it. A point cloud can be processed to construct a 3-D model of the objects. In some embodiments, sensor 140 may also be other types of sensors such as RADAR sensors, Sonic and Ultra Sonic sensors.

As vehicle 100 travels along the trajectory, sensor 140 may continuously capture data. Each set of scene data captured at a certain time point is known as a data frame. For example, sensor 140 may record a video consisting of multiple image frames captured at multiple time points. Sensor 140 may also capture point cloud frames at the multiple time points. The data frames may be transmitted to a server 160 in real-time (e.g., by streaming).

As illustrated in FIG. 1, vehicle 100 may be additionally equipped with sensor 150. In some embodiments, sensor 150 may include positioning sensors, such as a GPS receiver and one or more IMU sensors. By combining the GPS receiver and the IMU sensor, sensor 150 can provide real-time pose information of vehicle 100 as it travels, including the positions and orientations (e.g., Euler angles) of vehicle 100 at each time point. In some embodiments, sensor 150 may take vehicle measurements such as vehicle pose information, at the same time points where sensor 140 captures the image frames.

Consistent with the present disclosure, sensors 140 and 150 may communicate with server 160. In some embodiments, server 160 may be a local physical server, a cloud server (as illustrated in FIG. 1), a virtual server, a distributed server, or any other suitable computing device. Server 160 may communicate with sensors 140, 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Consistent with the present disclosure, server 160 may be responsible for estimating vehicle data based on the sensor measurements. In some embodiments, server 160 may include at least two processing units to process the sensor measurements in parallel. At least one processor unit is configured to calculate vehicle data based on the sensor measurements using a regular approach, e.g., to identify vehicle velocity, acceleration, heading, color, maker, etc. from image frames of a video feed captured by sensor 140. Another processor unit is configured to estimate vehicle data from the sensor measurements using an expedited approach. In some embodiments, the expedited approach uses a prediction model trained for predicting vehicle data faster than the regular approach. For example, the processor unit may predict vehicle data based on vehicle data at previous time points and a prediction model specifying the behavior of vehicle data among different image frames. In some embodiments, the expedited approach can predict vehicle data in real-time.

In some embodiments, the prediction model may be a learning network defined by multiple parameters. Because the prediction model predicts future vehicle data based on existing vehicle data, errors caused by the model may be accumulated over time. To ensure the accuracy of prediction model and reduce the accumulated error, the model may be updated using vehicle data computed through the regular approach. In some embodiments, the computed vehicle data (through the regular approach) and the estimated vehicle data (through the expedited approach) may be compared. For example, a difference between the two may be feedback to update the parameters of the prediction model.

Although the present disclosure describes estimation of vehicle data based on sensor measurements, it is contemplated that the disclosed systems and methods may be adapted to estimate other data unrelated to sensor measurements or unrelated to a vehicle. In addition, the disclosed systems and methods may also be adapted to perform operations other than data estimation.

Figure 2:
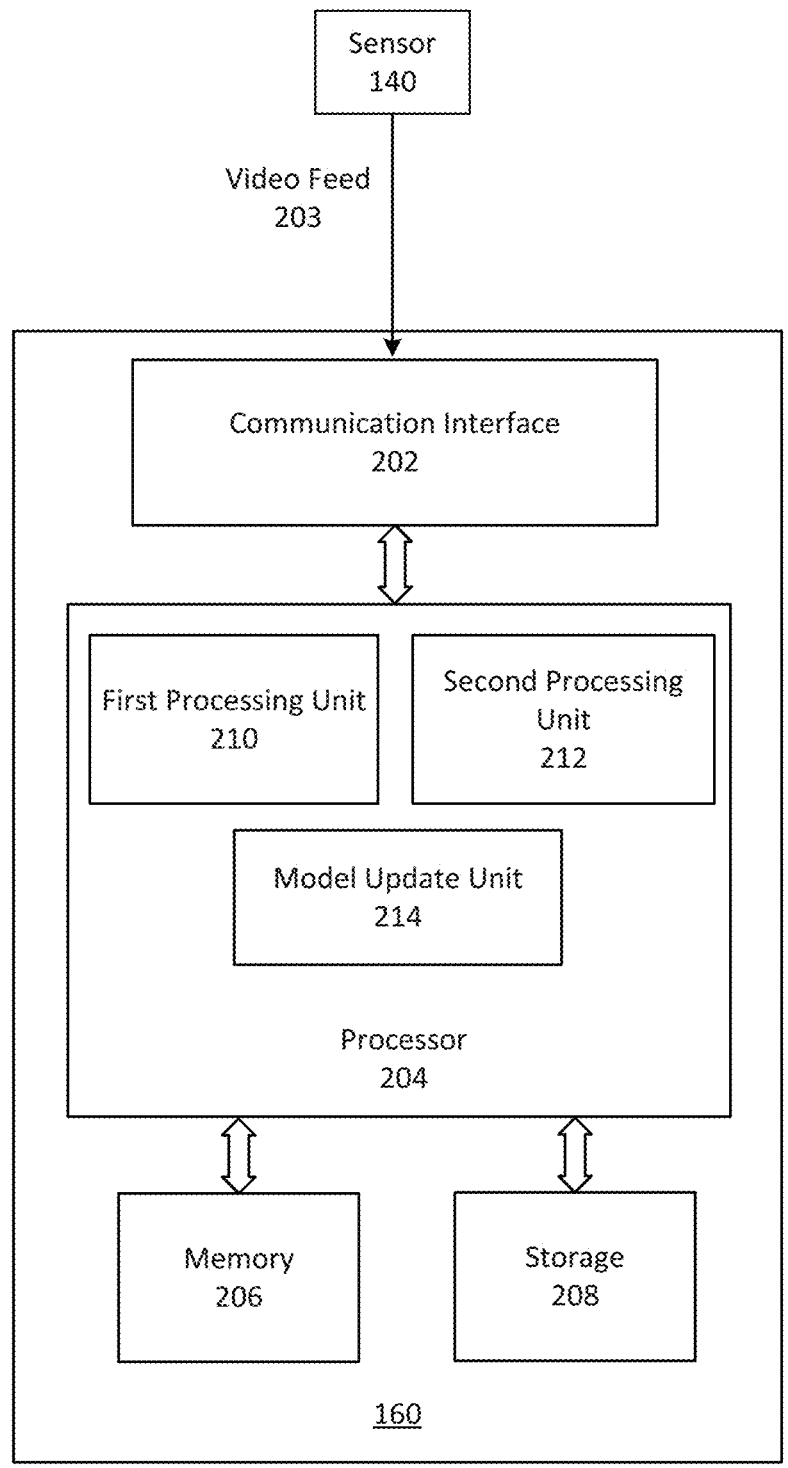
FIG. 2 illustrates a block diagram of an exemplary server for ballistically estimating vehicle data, according to embodiments of the disclosure.

For example, FIG. 2 illustrates a block diagram of an exemplary server 160 for ballistically estimating vehicle data, according to embodiments of the disclosure. Consistent with the present disclosure, server 160 may receive measurements from sensor 140 and sensor 150. Based on the sensor measurements, server 160 may estimate vehicle data through a dual processor approach.

In some embodiments, as shown in FIG. 2, server 160 may include a communication interface 202, a processor 204, a memory 206, and a storage 208. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 160 may be located in a cloud, or may be alternatively in a single location (such as inside vehicle 100 or a mobile device) or distributed locations. Components of server 160 may be in an integrated device, or distributed at different locations but communicate with each other through a network (not shown).

Communication interface 202 may send data to and receive data from components such as sensors 140 and 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data such as a video feed 203 captured by sensor 140. Communication interface 202 may further provide the received data to storage 208 for storage or to processor 204 for processing.

Processor 204 may include any appropriate type of general-purpose or special-purpose microprocessor, digital signal processor, or microcontroller. Processor 204 may be configured as a separate processor module dedicated to estimating vehicle data. Alternatively, processor 204 may be configured as a shared processor module for performing other functions unrelated to estimating vehicle data.

As shown in FIG. 2, processor 204 may include multiple modules, such as a first processing unit 210, a second processing unit 212, and a model update unit 214, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-214 all within one processor 204, it is contemplated that these units may be distributed among multiple processors located near or remotely with each other.

First processing unit 210 may be configured to compute vehicle data based on sensor measurements received from sensors 140 and 150. The computation of first processing unit 210 provides results with very high accuracy but may be slow. For example, the computation result for time point $t_1$ may not be available until time point $t_5$. Therefore, the computation of first processing unit 210 is not real-time.

In some embodiments, first processing unit 210 may be further configured to compute a model for the current behavior of the results, and share the model with second processing unit 212. In some embodiments, the model may be a learning network defined by multiple model parameters.

Second processing unit 212 may be configured to estimate vehicle data for the next time points using the model based on the vehicle data for previous time points. For example, the vehicle data $V(t_k)$ at time point $t_k$ may be estimated using model F as $V(t_k)=F(V(t_{k-1}), a, b, c)$ where $V(t_{k-1})$ is the vehicle data at time point $t_{k-1}$ and a, b, and c are model parameters. Second processing unit 212 is not necessarily connected to the external sensors (i.e. sensors 140 and 150), but only tries to predict the results based on what first processing unit 210 shared. Because data processing using the model may involve much less computations, the estimation performed by second processing unit 212 may be extremely fast. Accordingly, the computation result for time point $t_k$ may be available in real-time, e.g., shortly after time point $t_k$.

Model update unit 214 may be configured to update the model. In some embodiments, the model may be updated upon the next computation result from first processing unit 210 becomes available. In some embodiments, the model may be updated based a difference between the computed result by first processing unit 210 and the corresponding estimated result by second processing unit 212. For example, once calculated vehicle data for time point $t_2$ $VV(t_2)$ is available at time point $t_5$, its difference from the estimated vehicle data for time point $t_2$ $V(t_2) |VV(t_2)-V(t_2)|$ may be calculated. The model F may be updated based on $|VV(t_2)-V(t_2)|$. In some embodiments, the model parameters a, b, and c may be updated. The updated model may replace the model being used by second processing unit 212.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform vehicle data estimation functions disclosed herein. For example, memory 206 and/or storage 208 may be configured to store program(s) that may be executed by processor 204 to estimate vehicle data in real-time using a model that is adaptively updated using computed vehicle data.

Memory 206 and/or storage 208 may be further configured to store information and data used by processor 204. For instance, memory 206 and/or storage 208 may be configured to store the various types of data (e.g., image frames, pose information, etc.) captured by sensors 140 and 150 and the high-definition map. Memory 206 and/or storage 208 may also store intermediate data such as the computed data by first processing unit 210, estimated data by second processing unit 212, and the prediction model and its parameters, etc. The various types of data may be stored permanently, removed periodically, or disregarded immediately after each frame of data is processed.

Figure 3:
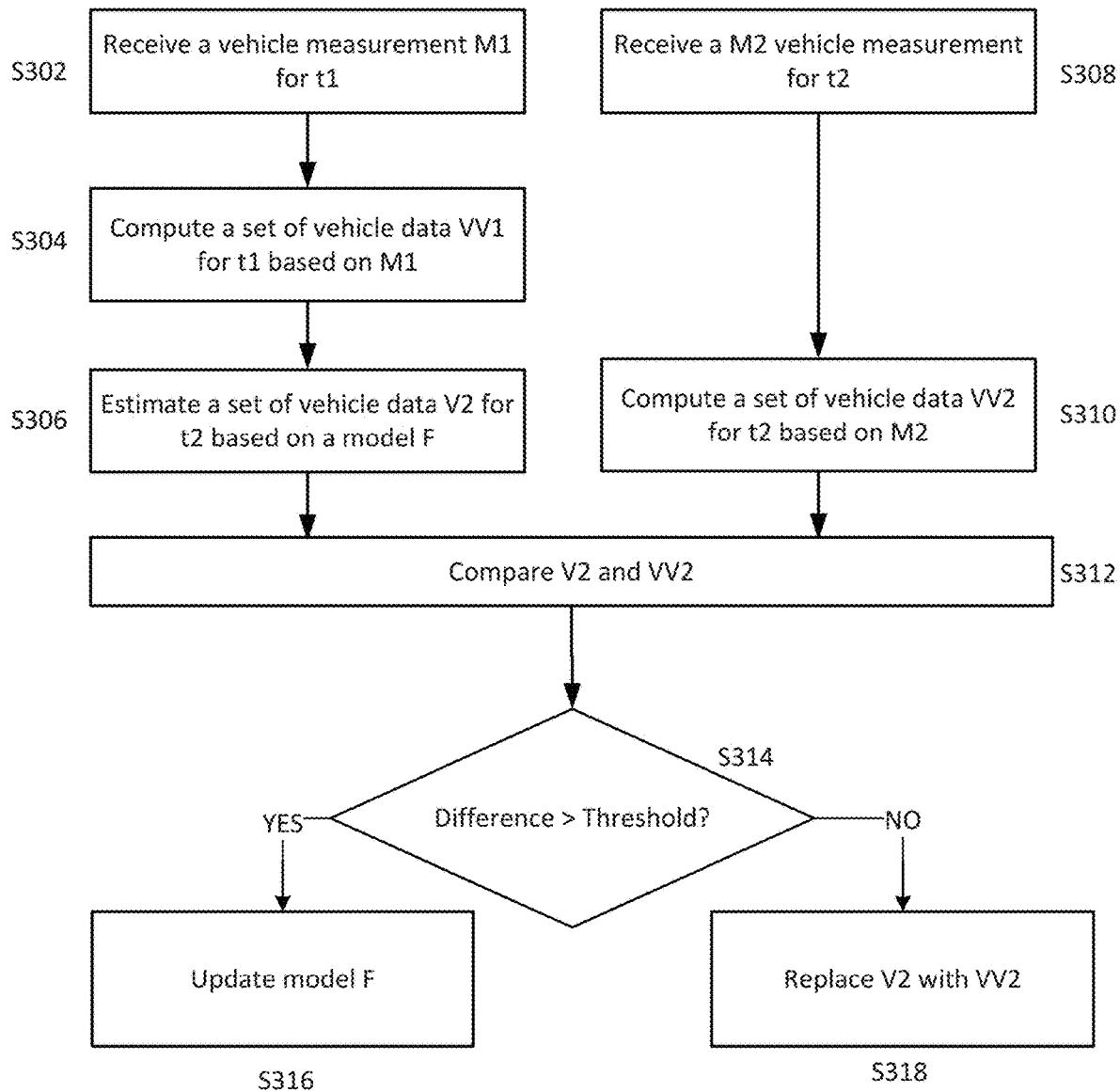
FIG. 3 illustrates a flowchart of an exemplary method for ballistically estimating vehicle data, according to embodiments of the disclosure.

FIG. 3 illustrates a flowchart of an exemplary method 300 for ballistically estimating vehicle data, according to embodiments of the disclosure. In some embodiments, method 300 may be implemented by server 160 that includes, among other things, processor 204. However, method 300 is not limited to that exemplary embodiment. Method 300 may include steps S302-S318 as described below. It is to be appreciated that some of the steps may be optional to perform the disclosure provided herein. Further, some of the steps may be performed simultaneously, or in a different order than shown in FIG. 3.

In step S302, vehicle measurement $M_1$ may be received at time point $t_1$. In some embodiments, vehicle measurement $M_1$ may be image data captured by sensor 140 or vehicle pose data acquired by sensor 150. In step S304, first processing unit 210 may compute a set of vehicle data $VV_1$ using the vehicle measurement $M_1$. For example, first processing unit 210 may identify vehicle velocity, acceleration, heading, color, and maker, etc. based on the image data received from sensor 140.

In step S306, second processing unit 212 may estimate a set of vehicle data $V_2$ corresponding to time point $t_2$. $V_2$ may be estimated using model F provided by first processing unit 210. For example, $V_2=F(VV_1, a, b, c)$. In step S308, vehicle measurement $M_2$ may be received at time point $t_2$. Similar to $M_1$, vehicle measurement $M_2$ may be image data captured by sensor 140 or vehicle pose data acquired by sensor 150.

In step S310, first processing unit 210 may compute a set of vehicle data $VV_2$ using the vehicle measurement $M_2$. In some embodiments, the computation may involve a significant number of computations. Therefore, the computation result of $VV_2$ may not be available until much later than time point $t_2$. For example, $VV_2$ may be available at time point $t_5$.

In step S312, model update unit 214 may compare $VV_2$ with $V_2$, upon $VV_2$'s availability. In some embodiments, a difference between $VV_2$ and $V_2$ may be calculated, e.g., as $|VV_2-V_2|$. It is contemplated that a second order difference such as $\|VV(t_2)-V(t_2)\|$ or an even higher order difference may be calculated instead. The difference indicates an accumulated error in the estimated vehicle data.

In step S314, the difference is compared with a predetermined threshold. If the difference (i.e., the error) is sufficiently large (S314: yes), method 300 proceeds to step S316 to update the model F. In some embodiments, the model parameters, such as a, b, and c of model F, may be updated using the difference determined in step S312. Various algorithms may be used to update the model parameters, such as stochastic gradient descent (also known as a "hill-climbing" algorithm). The updated model F may be used for estimation of subsequent vehicle data. Accordingly, the accumulated estimated error is adaptively corrected every few time points.

If the difference (i.e., the error) is below the threshold (S314: no), method 300 proceeds to step S318 to substitute the estimated vehicle data $V_2$ with the more accurate, calculated data $VV_2$ for time point $t_2$. In some embodiments, vehicle data $V_3$, $V_4$, and $V_5$, etc. may be re-calculated using model F based on the more accurate $VV_2$. Step S318 may be optional.

Figure 4:
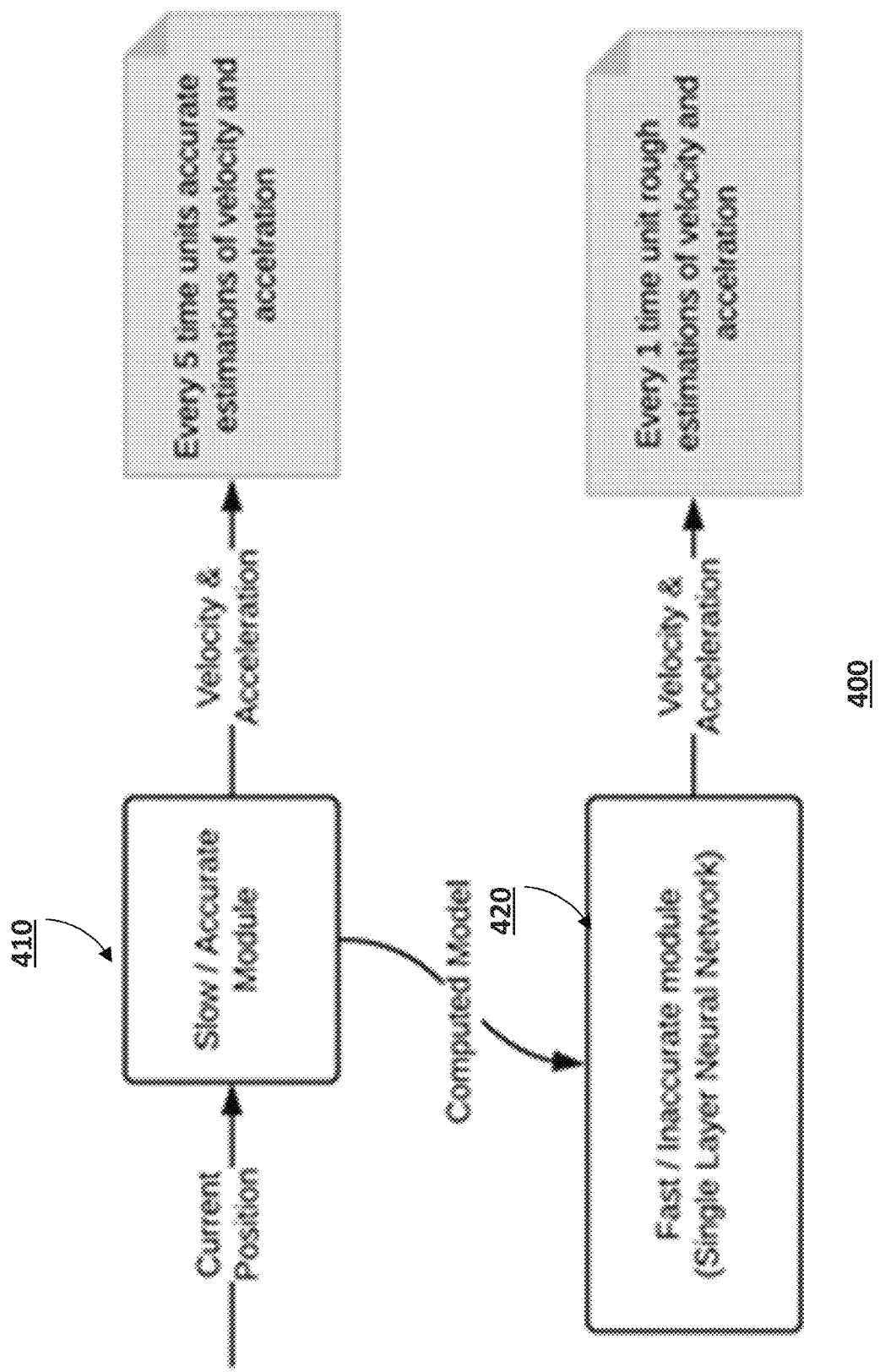
FIG. 4 illustrates an exemplary vehicle data estimation process, according to embodiments of the disclosure.

FIG. 4 illustrates an exemplary vehicle data estimation process 400, according to embodiments of the disclosure. Process 400 estimates vehicle velocity and acceleration data based on position measurements. For example, vehicle positions may be acquired by sensor 150 and received by server 160. As shown by FIG. 4, process 400 uses dual processing modules: a slow module 410 and a fast module 420.

Slow module 410 calculates vehicle velocity and acceleration data according to a function $F_i(\overline{x_i})$. For example, slow module 410 may use the following Equation (1):

$$\begin{cases} v_k = v_{[k-1]} + \sin k + \log(k+1) \\ S_k = S_{[k-1]} + v_{[k-1]} \end{cases} \quad (1)$$

where $v_k$ represents velocity at time k, and $S_k$ is the position at time k. In some embodiments, slow module 410 computes vehicle data every five time units based on the received position data.

Fast module 420 estimates vehicle velocity and acceleration data every time unit (i.e., in real-time) using a simple single layer perceptron network. For example, fast module 429 may use an approximation form to function $F_i(\overline{x_i})$ used by slow module 410:

$$\hat{F}_j(F_{i-1},\hat{F}_{j-1},A_{i-1})=A_{i-1}\cdot[F_{i-1},\hat{F}_{j-1}]^T \quad (2),$$

where $A_{i-1}$ is a set of parameter approximations updated at time $i-1$, $F_{i-1}$ is the previous true result of the computation, $\hat{F}_{i-1}$ is the previous approximation result, and i, j are the indices of the current slow and fast outputs respectively. There may be other parameters, such as current index j and partial inputs from the real world.

The parameters A are defined by slow module 410. In some embodiments, the model selection may be performed from a fix pool of polynomial and trigonometric functions. The model may be trained by slow module 410 based on previously observed points using stochastic gradient descent algorithms. For example, after a certain number of iterations (e.g., 100 iterations), $\hat{F}_i$ converges to a model with four time parameters: [t, t^2, t^3, tan(t)].

In order for fast module 420 to maintain its computation accuracy, its parameters may be periodically updated. A residual error between the two functions may be calculated. In some embodiments, the residual error may be the square of the output differences, which can be written as $\varepsilon_{i,j}=F_i^2+\hat{F}_j^2-2F_i\hat{F}_j$. In some embodiments, the model parameters may be updated at every iteration i, which is the rate of the slow module 410 (i.e., every five time units). For example, parameters A may be updated using Equation (3) as follows:

$$A_{i+1}=A_i-\gamma\nabla\varepsilon_i\cdot(A_i) \quad (3).$$

If γ is small enough, $\varepsilon_i\geq\varepsilon_{i+1}$, may be achieved, which means that the residual error will be smaller after each update. The choice of γ affects how fast the equations converge and how accurate is the convergence. If γ is very big, the algorithm either converges immediately to a suboptimal solution, or never converges at all (oscillates between bad solutions). If γ is very small, the algorithm converges, but may take many iterations, which may slow down process 400.

In some embodiments, assuming that function ε is convex and ∇ε is Lipschitz, convergence may be guaranteed by setting the γ as:

$$\gamma_i = \frac{(A_i - A_{i-1})^T(\nabla\varepsilon_i - \nabla\varepsilon_{i-1})}{\|\nabla\varepsilon_i - \nabla\varepsilon_{i-1}\|^2}. \quad (4)$$

Although a "hill-climbing" algorithm is described above as an example for updating the model parameters, it is contemplated that other gradient descent algorithms may be implemented as well. In addition, although model F is described above as a collection of linear equations, it is contemplated that other more sophisticated prediction models may be used by fast module 420. In some embodiments, the model may be a learning network, such as a neural network.

Figure 5:
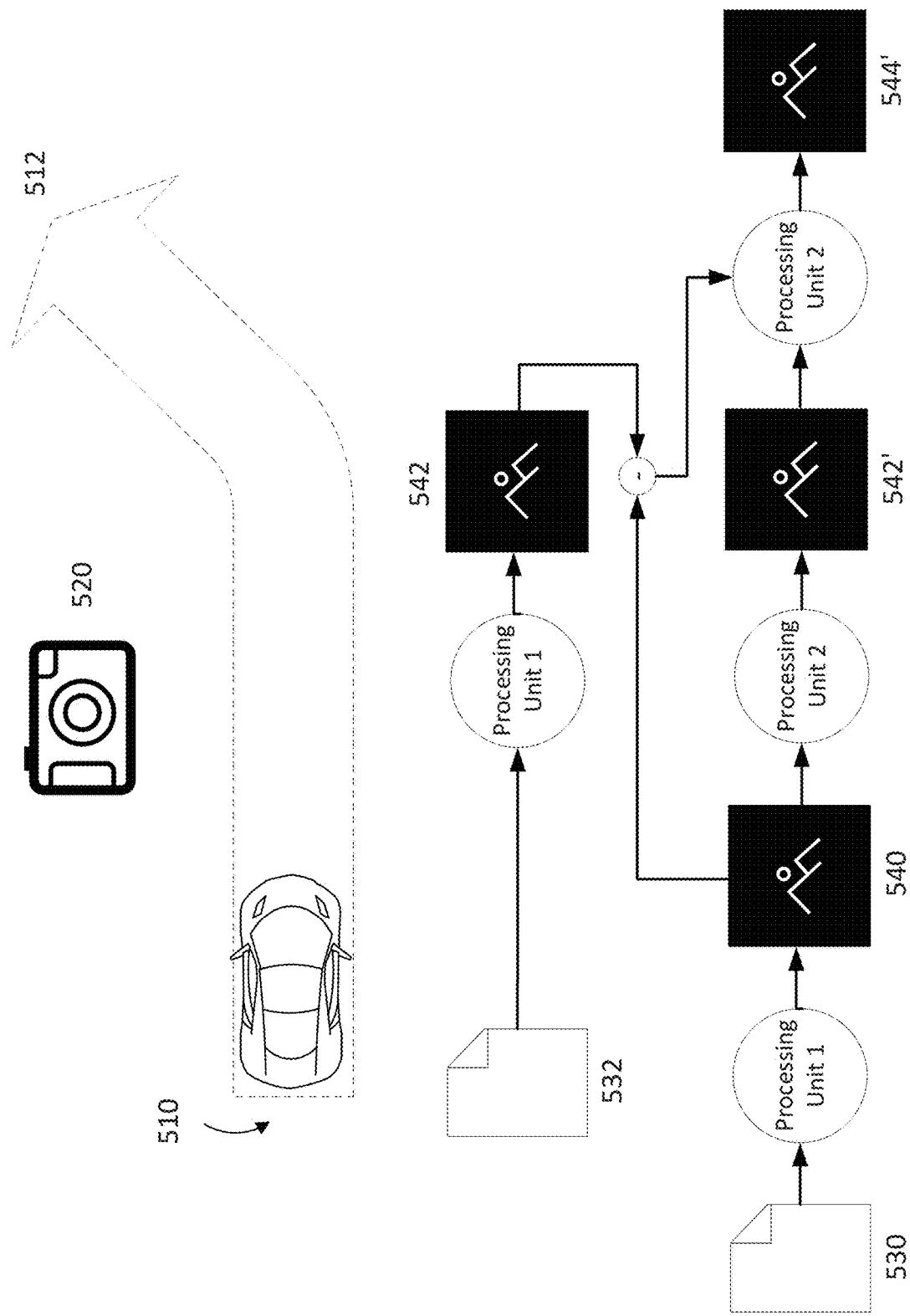
FIG. 5 illustrates an exemplary vehicle data estimation process based on a video feed, according to embodiments of the disclosure.

FIG. 5 illustrates an exemplary vehicle data estimation process 500 based on a video feed, according to embodiments of the disclosure. As shown in FIG. 5, vehicle 510 may travel along a trajectory 512. A camera 520 equipped on another vehicle (not shown) may capture a video of vehicle 510 as it travels along trajectory 512. The video may contain image frames captured at a set of time points. Typically, a set time interval is used between every two time points. For example, a new image frame may be captured every 1 ms, 2 ms, or the like. Vehicle 510 is at a different position corresponding to each time point when a new image frame is captured. Accordingly, each image frame can be associated with a vehicle position.

Process 500 may process the image frames of the video using a dual processor system to determine a number of vehicle data, such as vehicle 510's location, heading, velocity, color, shape, maker, etc. For example, process 500 may use processing unit 1 and processing unit 2. Processing unit 1 may be first processing unit 210 and processing unit 2 may be second processing unit 212, as described in connection with FIG. 2. For example, an image frame 530 captured at time point $t_1$ may be processed by processing unit 1 to determine vehicle data 540. In some embodiments, processing unit 1 may use image segmentation, image recognition, and other image processing methods to obtain vehicle data 540 from image frame 530. Image processing, particularly when the video feed is high-resolution, may require significant processing time. Accordingly, processing unit 1 may provide results in a slow, non-realtime fashion.

Processing unit 2 then estimates the next set of vehicle data 542' (for time point $t_2$) based on vehicle data 540 using a predication model provided by processing unit 1. The model simplifies the computation by using existing knowledge by processing unit 1. In some embodiments, the model predicts where the vehicle 510 is going to be next based on given velocity, heading, and position. For example, the next position is previous position+velocity, and the next velocity is current velocity+acceleration. The model predicts the color of vehicle 510 based on its color at the previous time point and a determination if the vehicle is entering a shaded area. The model can assume that the shape and make of vehicle 510 should not change. Accordingly, the computation by processing unit 2 may be extremely fast.

Processing unit 2 does not consider the video input in its estimation, but only the vehicle data for previous time point(s). For example, processing unit 2 may continue to estimate the next set of vehicle data 544' (for time point $t_3$) using the predication model and vehicle data 542'.

In parallel with the processing by processing unit 2, processing unit 1 continues to process the video feed in the slower fashion. For example, processing unit 1 may process an image frame 532 captured at time point $t_2$ to determine vehicle data 542. Vehicle data 542 may not be available in real-time, but rather a few time points later, such as at time point $t_5$. If the prediction model is accurate, estimated vehicle data 542' may be sufficiently close to vehicle data 542. However, the model, being an approximation of the process performed by processing unit 1, typically contains an estimation error.

In order to correct that error, the prediction model used by processing unit 2 may be periodically updated using the accurate result. For example, vehicle data 542 and 542' may be compared, and a difference between the two may be calculated. The difference may be used to update parameters of the prediction model used by processing unit 2. Accordingly, processing unit 2 may use the updated model to predict the vehicle data for subsequent time points.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for ballistically estimating vehicle data, comprising:
   a communication interface configured to receive a first vehicle measurement taken at a first time point and a second vehicle measurement taken at a second time point; and
   a plurality of processors, configured to:
      estimate, by a first processor of the plurality of processors, a first version of vehicle data at a first speed for each of the second time point and a plurality of intermediate time points between the first time point and the second time point based on the first vehicle measurement using a machine learning prediction model;
      compute, by a second processor of the plurality of processors, a second version of vehicle data at a second speed for the second time point based on the second vehicle measurement, wherein the first speed is faster than the second speed; and
      determine whether to update the machine learning prediction model based on a comparison between the first version of vehicle data and the second version of vehicle data for the second time point.

2. The system of claim 1, wherein the first and second vehicle measurements are images of a moving vehicle captured by a sensor.

3. The system of claim 2, wherein the sensor is a static sensor located away from the moving vehicle.

4. The system of claim 1, wherein the machine learning prediction model estimates the first version of vehicle data in real-time.

5. The system of claim 1, wherein the first version of vehicle data for the second time point becomes available before the second time point.

6. The system of claim 1, wherein the plurality of processors are further configured to:
update the machine learning prediction model based on a difference between the first version of the second set of vehicle data and the second version of vehicle data for the second time point exceeding a threshold.

7. The system of claim 6, wherein to update the machine learning prediction model, the plurality of processors are configured to update a plurality of model parameters of the prediction model.

8. The system of claim 6, wherein the machine learning prediction model is updated to reduce the difference between the first version of vehicle data and the second version of vehicle data for the second time point below the threshold.

9. The system of claim 1, wherein the plurality of processors are further configured to:
replace the first version of vehicle data for the second time point with the second version of vehicle data for the second time point based on a difference between the first version of vehicle data and the second version of vehicle data for the second time point not exceeding a threshold.

10. The system of claim 1, wherein the plurality of processors are further configured to:
estimate, by the first processor of the plurality of processors, the first version of vehicle data for a plurality of time points subsequent to the second time point based on the second version of vehicle data for the second time point using the machine learning prediction model.

11. A method for ballistically estimating vehicle data, comprising:
receiving, via a communication interface, a first vehicle measurement taken at a first time point and a second vehicle measurement taken at a second time point;
estimating, by a first processor, a first version of vehicle data at a first speed for each of the second time point and a plurality of intermediate time points between the first time point and the second time point based on the first vehicle measurement using a machine learning prediction model;
computing, by the second processor, a second version of vehicle data at a second speed for the second time point based on the second vehicle measurement, wherein the first speed is faster than the second speed; and
determining, by the first processor or the second processor, whether to update the machine learning prediction model based on a comparison between the first version of vehicle data and the second version of vehicle data for the second time point.

12. The method of claim 11, wherein the second vehicle measurements are images of a moving vehicle captured by a static sensor located away from the moving vehicle.

13. The method of claim 11, wherein the machine learning prediction model estimates the first version of vehicle data in real-time, wherein the first version of vehicle data for the second time point becomes available before the second time point.

14. The method of claim 11, further comprising:
updating the machine learning prediction model based on a difference between the first version of vehicle data and the second version of vehicle data for the second time point exceeding a threshold.

15. The method of claim 14, wherein updating the machine learning prediction model further comprises updating a plurality of model parameters of the machine learning prediction model to reduce the difference between the first version of vehicle data and the second version of vehicle data for the second time point below the threshold.

16. The method of claim 15, further comprising:
replacing the first version of vehicle data for the second time point with the second version of vehicle data for the second time point based on a difference between the first version of vehicle data and the second version of vehicle data for the second time point not exceeding a threshold.

17. The method of claim 16, further comprising:
estimating, by the first processor, the first version of vehicle data for a plurality of time points subsequent to the second time point based on the second version of vehicle data for the second time point using the prediction model.

18. A non-transitory computer-readable medium having a computer program stored thereon, wherein the computer program, when executed by a plurality of processors, performs a method for ballistically estimating vehicle data, comprising:
receiving, via a communication interface, a first vehicle measurement taken at a first time point and a second vehicle measurement taken at a second time point;
estimating, by a first processor of the plurality of processors, a first version of vehicle data at a first speed for each of the second time point and a plurality of intermediate time points between the first time point and the second time point based on the first vehicle measurement using a machine learning prediction model;
computing, by the second processor of the plurality of processors, a second version of vehicle data at a second speed for the second time point based on the second vehicle measurement, wherein the first speed is faster than the second speed; and
determining whether to update the machine learning prediction model based on a comparison between the first version of vehicle data and the second version of vehicle data for the second time point.

19. The non-transitory computer-readable medium of claim 18, wherein the method further comprises:
updating the machine learning prediction model based on a difference between the first version of vehicle data and the second version of vehicle data for the second time point exceeding a threshold.

20. The non-transitory computer-readable medium of claim 18, wherein the method further comprises:
replacing the first version of vehicle data for the second time point with the second version of vehicle data for the second time point based on a difference between the first version of vehicle data and the second version of vehicle data for the second time point not exceeding a threshold.

* * * * *